United States Patent
Zhang et al.

(10) Patent No.: US 9,430,224 B2
(45) Date of Patent: Aug. 30, 2016

(54) HOT-UPDATE METHOD AND APPARATUS

(71) Applicant: NetEase (Hangzhou) Network Co., Ltd., Hangzhou (CN)

(72) Inventors: Weitu Zhang, Hangzhou (CN); Liyi Lu, Hangzhou (CN)

(73) Assignee: Netease (Hangzhou) Network Co., Ltd., Hangzhou (CN)

( * ) Notice: Subject to any disclaimer, the term of this patent is extended or adjusted under 35 U.S.C. 154(b) by 0 days.

(21) Appl. No.: 14/671,474

(22) Filed: Mar. 27, 2015

(65) Prior Publication Data

US 2015/0355898 A1 Dec. 10, 2015

(30) Foreign Application Priority Data

Jun. 4, 2014 (CN) .......................... 2014 1 0245591

(51) Int. Cl.
| | |
|---|---|
| G06F 9/44 | (2006.01) |
| G06F 9/445 | (2006.01) |
| G06F 9/45 | (2006.01) |
| G06F 9/455 | (2006.01) |

(52) U.S. Cl.
CPC . *G06F 8/67* (2013.01); *G06F 8/41* (2013.01); *G06F 9/4552* (2013.01)

(58) Field of Classification Search
CPC ............... G06F 8/65; G06F 8/67; G06F 8/41
See application file for complete search history.

(56) References Cited

U.S. PATENT DOCUMENTS

| | | | | |
|---|---|---|---|---|
| 8,510,729 B2* | 8/2013 | Weissman | ................ | G06F 8/71 717/120 |
| 8,607,208 B1* | 12/2013 | Arnold | ..................... | G06F 8/67 717/129 |
| 2007/0067373 A1* | 3/2007 | Higgins | ............. | G06F 11/3013 |
| 2009/0007096 A1* | 1/2009 | Chavez | ................... | H04L 63/20 717/176 |
| 2009/0007105 A1* | 1/2009 | Fries | ........................ | G06F 8/65 718/1 |
| 2009/0013318 A1* | 1/2009 | Aderton | ................ | H04L 41/046 717/171 |
| 2009/0113386 A1* | 4/2009 | Eker | ........................ | G06F 8/68 717/108 |
| 2010/0083224 A1* | 4/2010 | Arnold | ..................... | G06F 8/67 717/110 |
| 2011/0066829 A1* | 3/2011 | Tye | ........................ | G06F 8/4441 712/226 |
| 2013/0219380 A1* | 8/2013 | Rogers | ..................... | G06F 8/71 717/172 |
| 2014/0053145 A1* | 2/2014 | Steigleder | ................. | G06F 8/65 717/169 |
| 2015/0082293 A1* | 3/2015 | Thomas | .................... | G06F 8/65 717/168 |

* cited by examiner

*Primary Examiner* — Chameli Das
(74) *Attorney, Agent, or Firm* — Fitch, Even, Tabin & Flannery LLP

(57) ABSTRACT

The embodiments of the present invention provide a hot-update method and apparatus. For example, the method can include: obtaining, in response to receiving a hot-update instruction by a running program, an update assembly and difference descriptions for describing differences between the update assembly and an existing assembly of the running program, wherein, identical metadata in the update assembly and existing assembly have identical identifiers; loading the update assembly into memory, and finding, in the update assembly, functions which have been modified with respect to the existing assembly according to the difference descriptions; performing just-in-time compilation to the modified functions thus found to obtain update native code; and running the update native code in place of corresponding existing native code of the modified functions when the existing native code is required to be run.

15 Claims, 3 Drawing Sheets

HOT-UPDATE METHOD AND APPARATUS

CROSS REFERENCE TO RELATED APPLICATIONS

This application claims the benefit and priority of Chinese patent application CN201410245591.9 filed on Jun. 4, 2014. The entire disclosure of the above application is incorporated herein by reference.

TECHNICAL FIELD

The embodiments of the present invention relate to the field of computer application, and more particularly, to a hot-update method and apparatus.

BACKGROUND

This section is intended to provide the background or context for embodiments of the present invention as recited in the claims. What is described herein is not admitted to be prior art by inclusion in this section.

For a system providing services via Internet, a malfunction which occurs during system operation should be repaired quickly, so as to ensure the quality of service. Thus, the malfunction is generally fixed in an online hot-updating manner, in order to provide better user experience.

Currently, the common practice for hot-update is to modularize methods (i.e., code block comprising a series of statements) and design each module as a separate DLL (Dynamic Link Library) during system development. Also, it is required that running status cannot be recorded in variables of each module, otherwise the running status recorded in variables will be lost once the original DLL is unloaded; and it is further required that class definitions should be separated from method definitions, otherwise the objects generated from class definitions in the original module will become unavailable after the original DLL is unloaded. Thus, a system implemented by the above-mentioned practice can implement hot-update through dynamically unloading the original DLL and loading an updated DLL.

SUMMARY

In this context, the embodiments of the present invention aim to provide a hot-update method and apparatus.

In a first aspect of the embodiments of the invention, a hot-update method is provided, the method, for example, includes: obtaining, in response to receiving a hot-update instruction by a running program, an update assembly and difference descriptions for describing differences between the update assembly and an existing assembly of the running program, wherein, identical metadata in the update assembly and existing assembly have identical identifiers; loading the update assembly into memory, and finding, in the update assembly, functions which have been modified with respect to the existing assembly according to the difference descriptions; performing just-in-time compilation to the modified functions which have been found to obtain update native code; and running the update native code in place of corresponding existing native code of the modified functions when the existing native code is required to be run.

In a second aspect of the embodiments of the invention, a hot-update apparatus is provided, the apparatus, for example, can include: a receiving unit configured to obtain, in response to receiving a hot-update instruction by a running program, an update assembly and difference descriptions for describing differences between the update assembly and an existing assembly of the running program, wherein, identical metadata in the update assembly and existing assembly have identical identifiers; a modification determining unit configured to load the update assembly into memory, and find, in the update assembly, functions which have been modified with respect to the existing assembly according to the difference descriptions; a just-in-time compiling unit configured to perform just-in-time compilation to the modified functions thus found to obtain update native code; and a running unit configured to run said update native code in place of corresponding existing native code of the modified functions when the existing native code is required to be run.

In a third aspect of the embodiments of the invention, a system is provided, wherein the system for example can include one or more processing devices, and one or more non-transitory machine-readable media configured to store instructions that are executable by the one or more processing devices to perform operations including: obtaining, in response to receiving a hot-update instruction by a running program, an update assembly and difference descriptions for describing differences between the update assembly and an existing assembly of the running program, wherein, identical metadata in the update assembly and existing assembly have identical identifiers; loading the update assembly into memory, and finding, in the update assembly, functions which have been modified with respect to the existing assembly according to the difference descriptions; performing just-in-time compilation to the modified functions which have been found to obtain update native code; and running the update native code in place of corresponding existing native code of the modified functions when the existing native code is required to be run.

BRIEF DESCRIPTION OF THE DRAWINGS

The above and other objects, features and advantages of exemplary embodiments of the invention will become more easily understandable by reading the following detailed description with reference to the accompanying drawings, of which:

FIG. 2 schematically illustrates a diagram of a difference description file, in accordance with an embodiment of the invention.

In the drawings, identical or corresponding numerals represent identical or corresponding parts.

DETAILED DESCRIPTION OF THE INVENTION

Figure 1:
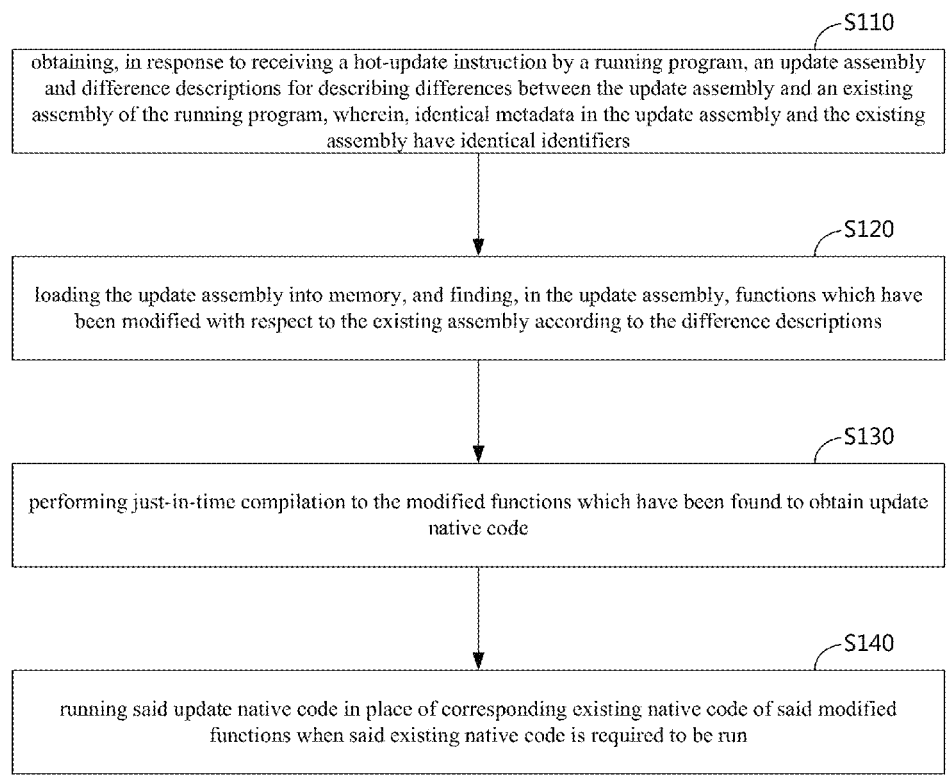
FIG. 1 schematically illustrates a flow diagram of a hot-update method, in accordance with an embodiment of the invention.

The principles and spirit of the present invention will be described below with reference to a number of exemplary embodiments. It should be understood that, embodiments are given merely for those skilled in the art to better understand and thus implement the invention, and do not limit the scope of the invention in any way. On the contrary, those embodiments are provided to make the disclosure more thorough and complete, so that the scope of the disclosure can be completely conveyed to those skilled in the art.

It is known to those skilled in the art that, the embodiments of the invention can be implemented as a system, apparatus, device, method or computer program product. Thus, the present disclosure can be specifically implemented in the form of complete hardware, complete software (including firmware, resident software, microcode, etc.), or combinations of hardware and software.

As the existing technique performs hot-update by way of dynamically unloading/loading DLLs, specific requirements are posed to the system program design. Therefore, how to perform hot update is still a very annoying issue in the prior art.

For this reason, a great need exists for an improved hot-update method to achieve the goal of not posing specific requirements to the system program design.

A hot-update method and apparatus are proposed in accordance to embodiments of the invention.

It is to be understood that, in this context, any number of elements in the drawings are used for illustration rather than limiting, and any naming is merely used for distinguishing purpose, without any meaning of limitation.

The principles and spirit of the present invention will be described in details below, with reference to a number of representative embodiments of the invention.

Briefing of the Invention

Metadata are data stored in an assembly for describing a program (e.g., type, as well as method also referred to as function). A runtime library makes reference to metadata by the identifiers thereof, to find information such as class, member, inheritance, etc. The inventors have found that, for an update assembly acquired by compiling source codes modified according to update requirements, if identical metadata in the update assembly and an existing assembly of the system have identical identifiers (i.e., having identical numerals), then existing objects are still valid, and therefore update native code obtained by performing just-in-time compilation to functions in the update assembly which have been modified with respect to the existing assembly of the system can still use the existing objects, and data recording dynamics during runtime of the system will not be lost. Hence, the system can be updated during runtime by running the update native code in place of the corresponding existing native code of the modified functions, without posing specific requirements to the source code design of the system program.

With the hot-update method and apparatus of embodiments of the invention, the update native code obtained by performing just-in-time compilation to the functions in the update assembly which have been modified with respect to the existing assembly of the system can still use existing objects, since identical metadata in the update assembly and existing assembly of the program have identical identifiers. Therefore, the method of the invention is capable of updating the program during runtime by running the update native code in place of the corresponding existing native code of the modified functions, without posing specific requirements to the source code design of the program.

Having introduced basic principles of the present invention, various non-limiting embodiments of the invention will be presented below.

Overview of Application Scenario

The hot-update method of an exemplary embodiment of the invention can, for example, be applied to online update for a massive online gaming system (including a server(s) and/or a client(s)).

Exemplary Method

The hot-update method according to an exemplary embodiment of the invention will be described below with reference to FIG. 1, in connection with the above application scenario. It should be noted that, the above application scenario is shown merely to facilitate the understanding of the spirit and principles of the invention, and there is no limitation to the embodiments of the invention in this respect. On the contrary, the embodiments of the invention can be applicable to any suitable scenario.

For example, see FIG. 1, which is a flow diagram of the hot-update method provided by an embodiment of the invention. As shown, the embodiment of the invention can include:

S110: obtaining, in response to receiving a hot-update instruction by a running program, an update assembly and difference descriptions for describing differences between the update assembly and an existing assembly of the running program, wherein, identical metadata in the update assembly and existing assembly have identical identifiers.

Further, the method can also include, prior to receiving the hot-update instruction by the running program, compiling source codes modified according to requirements of the hot-update to generate the update assembly; performing structural adjustments to the update assembly, causing identical metadata in the adjusted update assembly and existing assembly of the running program to have identical identifiers; comparing the update assembly with existing assembly to generate a difference description file, wherein, the difference description file contains difference descriptions for describing the differences between the update assembly and the existing assembly; and sending the hot-update instruction to the running program, causing the running program to obtain the difference descriptions from the difference description file.

For example, the hot-update instruction and difference description file can be sent to the running program, and after the difference description file is parsed by the running program to determine the hot-update assembly corresponding to the difference description file, the running program correspondingly invokes a hot-update interface provided by a running environment, and then reads this update assembly at the running environment (e.g., Mono, cross-platform .NET running environment) level as well as performs subsequent hot-update operations. In order to reduce the amount of data to be transferred, the update assembly and existing assembly can be compared (wherein, identical metadata in the update assembly and existing assembly have identical identifiers), for example, by utilizing a 'xdelta' tool for comparing differences of binary files, to generate binary delta data comprising only the parts of the update assembly which are different from the existing assembly, and the generated binary delta data is sent to the running program as the update assembly. For example, the source codes modified in accordance with the hot-update requirements can be written in various programming languages, such as C#, Visual Basic .NET, C++/CLI Managed, F#, J#, Jscript .NET, Windows PowerShell, etc., and the modification thus made can include adding a new class, modifying a function, changing the access level of a function or field, adding a field to an existing object, etc. The update assembly compiled from the source codes can be of a human-readable common intermediate language (CIL). The update assembly can exist in the form of a dll or exe file.

It should be noted that, since the update assembly needs to be adjusted for the identical metadata thereof to have identical identifiers as those in the existing assembly so that existing objects are still available after the update, when performing adjustments to the update assembly to make its structure the same as that of the existing assembly, 'String Heap', 'User String Heap', 'Blob Heap' of the metadata in the adjusted update assembly can only add contents on the basis of existing content of the same metadata in the existing assembly, and cannot modify the existing content. Wherein, 'String Heap' is referenced by the metadata for representing method name (also referred to as function name), field name, class name, variable name, and resource-related strings, etc.; 'User String Heap' contains strings defined in the source code; 'Blob Heap' contains binary objects referenced by the metadata.

According to some embodiments of the invention, the update assembly and existing assembly can be compared by class, by function, and by statement using a 'differ' tool (a tool for comparison). While the comparison is being carried out, adjustment can be performed to the update assembly to make its structure the same as that of the existing assembly. Wherein, the difference description file can contain difference descriptions of all the differences between the update assembly and the existing assembly, such as description of classes being modified, description of functions being modified, description of attributes of fields being modified, etc. In some embodiments, whether there exists a modification that is beyond the capability of the hot-update (e.g., deleting an existing class definition is a modification beyond the capability of the hot-update) is monitored, and if there exists one, then an error message is returned, or if there exists none, then the difference description file is generated normally. For example, different difference descriptions in the difference description file can be divided by segments, and each segment is coded according to preset coding rules by the meaning it intends to express. For example, the difference descriptions can be contents shown in FIG. 2. For ease of understanding, different segments are represented with different background colors in FIG. 2. Referring to FIG. 2, for example: the meaning expressed by segment "EE 11 00 00 00 43 6C 61 73 73 4C 69 62 72 61 72 79 31 2E 64 6C 6C" can be the name "ClassLibrary1.dll" of the update assembly; the meaning expressed respectively by segments "83 02 00 00 06", "83 03 00 00 06", "83 06 00 00 06", "83 07 00 00 06", "83 09 00 00 06" and "83 12 00 00 06" can be that 6 methods (also referred to as functions) with IDs 06000002, 06000003, 06000006, 06000007, 06000009, 06000012 respectively have been changed; the meaning expressed respective by segments "85 08 00 00 04 06 00", "85 09 00 00 04 06 00", "85 0A 00 00 04 01 00" can be that attributes of three fields have been changed.

S120: loading the update assembly into memory, and finding, in the update assembly, functions which have been modified with respect to the existing assembly according to the difference descriptions.

For example, according to the difference descriptions shown in FIG. 2, it can be determined that function bodies of the 6 functions with IDs 06000002, 06000003, 06000006, 06000007, 06000009, 06000012 respectively have been changed, and the function bodies of the 6 functions with IDs 06000002, 06000003, 06000006, 06000007, 06000009, 06000012 respectively are found in the update assembly.

It should be noted that, when the update assembly is loaded into memory, the existing assembly can either be retained in the memory or be removed therefrom, which can be specifically determined according to whether there are data in the existing assembly which are still in use.

S130: performing just-in-time compilation to the modified functions which have been found to obtain update native code.

Just-in-time Compilation (JIT) means compiling an intermediate language such as CIL into native code at runtime. Native Code means code compiled into machine code for a particular processor, which can be directly executed by the processor.

S140: running the update native code in place of corresponding existing native code of modified functions when the existing native code is required to be run.

For example, a first instruction of the corresponding existing native code of the modified functions can be modified into a jump instruction to jump to and run at the update native code, and the first instruction of corresponding existing native code of the modified functions will be entered into and run when the existing native code is required to be run, thereby jumping from running of the jump instruction to running at the update native code. In order to find the location of the existing native code in memory so as to modify the first instruction, for example, when functions in the existing assembly are compiled into native code, correspondences between IDs of the functions and locations in memory where the existing native code corresponding to the functions reside can be recorded, thereby finding the location in memory where the existing native code corresponding to the modified functions reside according to the correspondences so as to modify the first instruction at this location, when the first instruction of the existing native code needs to be modified.

According to some embodiments of the invention, if the modified functions are generic functions, it is required to further find all functions instantiated using said generic functions; perform just-in-time compilation respectively to each of the functions instantiated using the generic functions to obtain corresponding update native code; modify a first instruction of the corresponding existing native code of each of the functions instantiated using the generic functions into a jump instruction to jump to and run at the corresponding update native code. For example, when functions are instantiated from the generic functions, the mapping relationships between the generic functions and the functions instantiated therefrom can be recorded, e.g., in a hash table; if the modified functions are generic functions, then all of the functions instantiated using said generic functions can be found in the record of the mapping relationships between the generic functions and the functions instantiated therefrom.

According to some embodiments of the invention, if it is determined that it is necessary to modify the access level of specified methods and/or access level of specified fields according to the difference descriptions, then corresponding objects of the specified methods and/or corresponding objects of specified fields can be found; and corresponding modifications are made to the access attribute of the objects thus found. For example, such embodiments can change the access level of a method or a field from 'public' to 'private', and vice versa.

According to some embodiments of the invention, fields can be added to existing objects. The fields can be variables of any type. For example, the specific embodiment thereof can be: causing the update assembly to contain a specific function for recording mapping relationships between the added fields and the existing objects in a global hash table; when corresponding native code of the specific function is running, the native code performs the step of recording mapping relationships between the added fields and the existing objects in the global hash table; when existing objects are referenced, accessing the corresponding added fields of existing objects according to mapping relationships recorded by the global hash table. In this embodiment, in the mapping relationships of global hash table including key and value, 'key' can be the existing objects, and 'value' can be equivalent to a container for the added fields of the existing objects. In addition, in order to be able to timely release the memory occupied by unreferenced objects, the reference to existing objects generated by recording the mapping relationships in the global hash table is a weak reference, so that when the existing objects are not referenced, a garbage collector can timely collect the objects to release the memory they occupy. Moreover, in order to improve the search efficiency of the global hash table, the mapping relationships recorded in the global hash table can be traversed as needed, and inspection is performed as to whether the corresponding objects in the traversed mapping relationships are referenced; if not, the mapping relationships of the unreferenced objects are deleted from the global hash table, thereby causing the global hash table to save only the mapping relationships to be used, so as to improve the search efficiency for mapping relationships.

According to some embodiments of the invention, there can be classes in the update assembly and the existing assembly produced when the compiler compiles the source code for optimization. The number of internal classes and internal fields of the classes produced for optimization in the update assembly and existing assembly can be different. It will be appreciated that, the identifiers such as numerals of metadata in the assemblies are arranged in sequential order of the number of metadata, and if the number of internal classes and internal fields of the classes produced for optimization in the update assembly and the existing assembly are different, it will result in certain identical metadata in the update assembly and existing assembly being arranged with different identifiers, which in turn, causing certain existing objects being unavailable. Therefore, in order to enable the identical metadata in the update assembly and existing assembly to be identified consistently, prior to the structural adjustments to the update assembly, the embodiments of the invention also compare definitions of classes produced by compiler optimization in the update assembly and the existing assembly, and if the definitions of the classes produced by compiler optimization in the update assembly and existing assembly are different, the names of the classes produced by compiler optimization in the update assembly are modified, and the definitions of the classes produced by compiler optimization in the existing assembly are copied into the update assembly. For example, the class produced by a C# compiler for optimization is <PrivateImplementationDetails>, and the name of the class produced by compiler optimization in the update assembly can be modified to <PrivateImplementationDetails>{MVID}, therefore data consistency can be maintained after the update as the class <PrivateImplementationDetails> has been copied from the existing assembly, so that all of the existing objects are still available.

It can be seen that by applying the hot-update method provided by the embodiments of the invention, the update native code obtained by performing just-in-time compilation to the modified functions can use existing objects, and the data for recording dynamics during runtime of the program will not be lost, since the identical metadata in the received update assembly and the existing assembly have identical identifiers. Therefore, hot-update can be carried out by running the update native code in place of the corresponding existing native code of the modified functions when the existing native code is to be run, without posing specific requirements to the source code design.

Exemplary Apparatus

Figure 3:
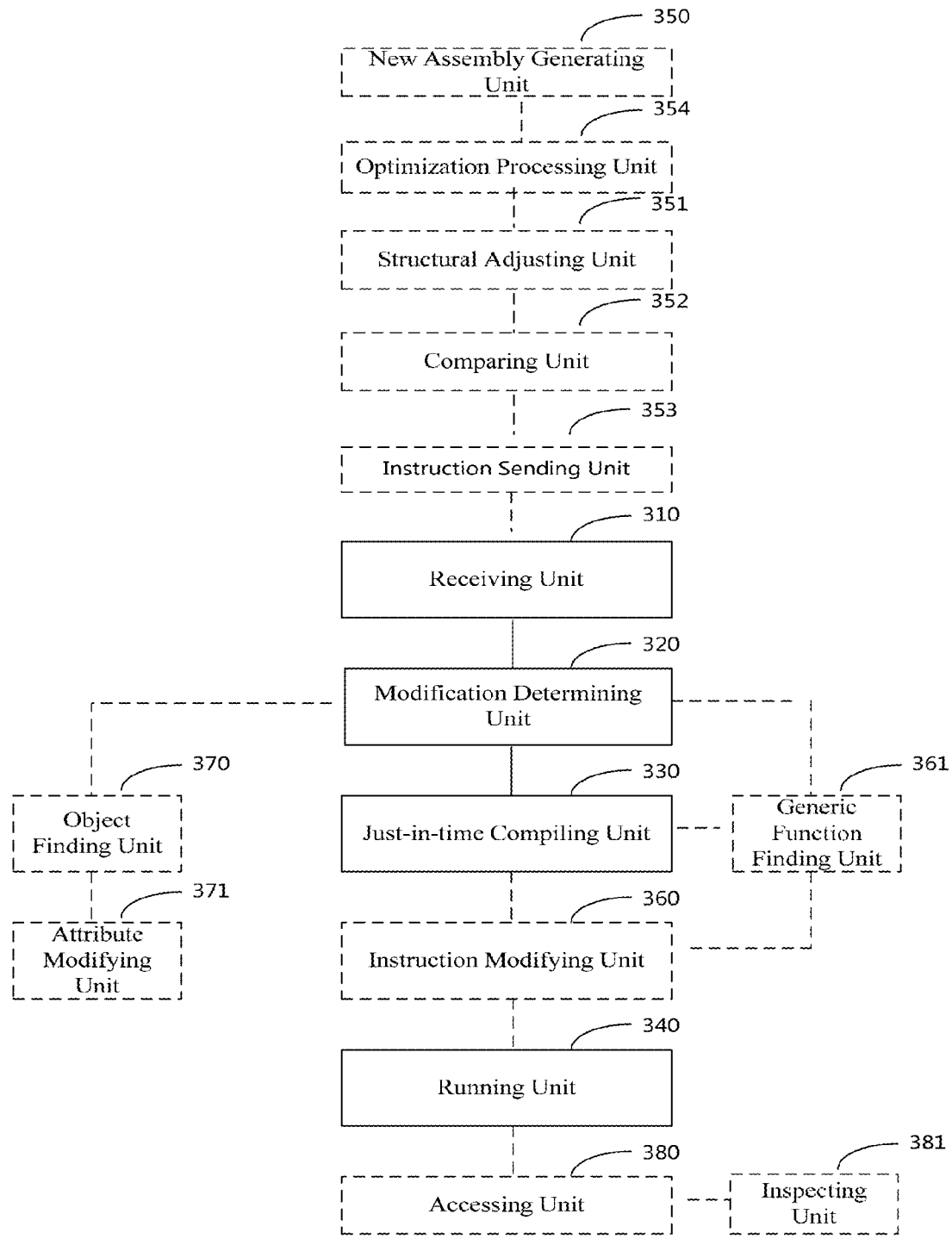
FIG. 3 schematically illustrates a structure diagram of a hot-update apparatus, in accordance with an embodiment of the invention.

Having presented the method of the exemplary embodiments of the invention, a hot-update apparatus of an exemplary embodiment of the invention will then be described with referenced to FIG. 3.

For example, see FIG. 3, which is a structure diagram of a hot-update apparatus provided by an embodiment of the invention. As shown, one embodiment of the invention can include:

a receiving unit 310 configured to obtain, in response to receiving a hot-update instruction by a running program, an update assembly and difference descriptions for describing differences between the update assembly and an existing assembly of the running program, wherein, identical metadata in the update assembly and the existing assembly have identical identifiers; a modification determining unit 320 configured to load the update assembly into memory, and find, in the update assembly, functions which have been modified with respect to the existing assembly according to the difference descriptions; a just-in-time compiling unit 330 configured to perform just-in-time compilation to the modified functions which have been found to obtain update native code; and a running unit 340 configured to run the update native code in place of corresponding existing native code of the modified functions when the existing native code is required to be run.

Since identical metadata in the update assembly received by the receiving unit 310 of the apparatus provided by the embodiments of the invention and the existing assembly have identical identifiers, the update native code obtained from just-in-time compilation of the just-in-time compiling unit 330 to the modified functions found by the modification determining unit 320 is able to use existing objects, and the data for recording dynamics during runtime of the system will not be lost. Therefore, hot-update can be carried out by running the update native code in place of the corresponding existing native code of the modified functions when the existing native code is to be run, without posing specific requirements to the source code design.

According to some embodiments of the invention, the hot-update apparatus can also include: a new assembly generating unit 350 configured to compile source codes modified according to requirements of the hot-update to generate the update assembly; a structural adjusting unit 351 configured to perform structural adjustments to the update assembly, causing identical metadata in the adjusted update assembly and the existing assembly of the running program to have identical identifiers; a comparing unit 352 configured to compare the update assembly with the existing assembly to generate a difference description file, wherein, the difference description file contains the difference descriptions for describing the differences between the update assembly and the existing assembly; an instruction sending unit 353 configured to send the hot-update instruction to the running program, causing the running program to obtain the difference descriptions from the difference description file.

According to some embodiments of the invention, the hot-update apparatus can also include: an instruction modifying unit 360 configured to modify a first instruction of the corresponding existing native code of the modified functions into a jump instruction to jump to and run at the update native code. The running unit 340 of the hot-update apparatus can be configured to enter into and run the first instruction of corresponding existing native code of the modified functions when the existing native code is required to be run, thereby jumping from the running of the jump instruction to running at the update native code.

According to some embodiments of the invention, the hot-update apparatus can also include: a generic function finding unit 361 configured to, if the modified functions are generic functions, find all functions instantiated using the generic functions in the update assembly. The just-in-time compiling unit 330 of the hot-update apparatus can be configured to perform just-in-time compilation respectively to each of the functions instantiated using the generic functions as found by the generic function finding unit 361, to obtain corresponding update native code. The instruction modifying unit 360 can be configured to modify a first instruction of the corresponding existing native code of each of the functions instantiated using the generic functions as found by the generic function finding unit 361 into a jump instruction to jump to and run at the corresponding update native code.

According to some embodiments of the invention, the hot-update apparatus can also include: an object finding unit 370 configured to, if it is determined that modification is needed for the access level of specified methods and/or the access level of specified fields according to the difference descriptions, find corresponding objects of the specified methods and/or corresponding objects of the specified fields; and an attribute modifying unit 371 configured to make corresponding modifications to the access attribute of the objects found by the object finding unit.

According to some embodiments of the invention, the update assembly can include: a specific function for recording mapping relationships between added fields and existing objects in a global hash table. When corresponding native code of the specific function is running, the native code performs the step of recording the mapping relationships between the added fields and the existing objects in the global hash table. Accordingly, the hot-update apparatus can also include an accessing unit 380 configured to, when the existing objects are referenced, access the corresponding added fields of the existing objects according to the mapping relationships recorded by the global hash table. In one embodiment, the reference to the existing objects generated by recording the mapping relationships in the global hash table can be a weak reference. The hot-update apparatus can also include: an inspecting unit 381 configured to traverse the mapping relationships recorded in the global hash table as needed, and inspect whether the corresponding objects in the traversed mapping relationships are referenced, if not, delete the mapping relationships of the unreferenced objects from the global hash table.

According to some embodiments of the invention, there may exist classes produced for optimization when the compiler compiles the source code in the update assembly and the existing assembly. In order to enable identical metadata in the update assembly and the existing assembly to be identified consistently, the hot-update apparatus can also include an optimization processing unit 354 configured to, prior to the structural adjustments of the structural adjusting unit 351 to the update assembly, modify the names of the classes generated by compiler optimization in the update assembly, and copy the definitions of the classes generated by compiler optimization in the existing assembly into the update assembly, if the definitions of classes generated by compiler optimization in the update assembly and the existing assembly are different.

It should be noted that, the new assembly generating unit 350, structural adjusting unit 351, comparing unit 352, instruction sending unit 353, instruction modifying unit 360, generic function finding unit 361, object finding unit 370, attribute modifying unit 371, accessing unit 380, inspecting unit 381, and optimization processing unit 354 are drawn in FIG. 3 with dashed lines to indicate that those units are not necessary units of the apparatus according to the embodiments of the invention.

It should be noted that, although a number of units or subunits of the hot-update apparatus have been set forth in the above detailed description, such division is non-mandatory. In fact, the features and functionalities of two or more of the units described above may be embodied in a single unit, in accordance with the embodiments of the invention. Conversely, the features and functionalities of a single unit describe above can be further divided to be embodied by a plurality of units.

Moreover, although the operations of the method according to the embodiments of the present invention have been described in a specific order in the drawings, this does not require or imply that those operations are necessarily performed in such specific order, or that all of the illustrated operations have to be performed to achieve desired results. Additionally or alternatively, certain steps may be omitted, a plurality of steps can be combined and performed in a single step, and/or a single step can be broken up into and performed in a plurality of steps.

Although the principles and spirit of the present invention have been described with reference to a number of specific embodiments, it should be understood that the present invention is not limited to the disclosed specific embodiments, and the division of various aspects does not mean that features in those aspects cannot be combined to benefit, and such division is merely for the convenience of presentation. The present invention is intended to cover various modifications and equivalent arrangements within the spirit and scope of the appended claims.

What is claimed is:

1. A hot-update method, comprising:
   obtaining, in response to receiving a hot-update instruction by a running program, an update assembly and difference descriptions for describing differences between the update assembly and an existing assembly of the running program, wherein, identical metadata in said update assembly and said existing assembly have identical identifiers;
   loading said update assembly into memory, and finding, in said update assembly, functions which have been modified with respect to the existing assembly according to said difference descriptions;
   performing just-in-time compilation to the modified functions which have been found to obtain update native code;
   running said update native code in place of corresponding existing native code of said modified functions when said existing native code is required to be run;
   determining if it is necessary to modify an access level of a specified method or an access level of a specified field according to said difference descriptions, and if it is determined necessary, finding a corresponding object of said specified method or corresponding object of said specified field; and making a corresponding modification to an access attribute of the object which has been found.

2. The method of claim 1, prior to the step of obtaining, further comprising:
compiling source codes modified according to requirements of said hot-update to generate the update assembly;
performing structural adjustments to said update assembly, causing identical metadata in the adjusted update assembly and the existing assembly of the running program to have identical identifiers;
comparing said update assembly with said existing assembly to generate a difference description file, wherein, said difference description file contains the difference descriptions for describing the differences between the update assembly and the existing assembly; and
sending the hot-update instruction to said running program, causing the running program to obtain said difference descriptions from said difference description file.

3. The method of claim 2, prior to performing structural adjustments to said update assembly, further comprising:
modifying the names of the classes generated by compiler optimization in said update assembly, and copying the definitions of the classes generated by compiler optimization in said existing assembly into said update assembly, if the definitions of classes generated by compiler optimization in said update assembly and said existing assembly are different.

4. The method of claim 1, further comprising: modifying a first instruction of the corresponding existing native code of said modified functions into a jump instruction so as to jump to and run at said update native code;
wherein the step of running said update native code in place of the corresponding existing native code of said modified functions when said existing native code is required to be run comprises: entering into and running said first instruction of said corresponding existing native code of said modified functions when said existing native code is required to be run, thereby jumping from the running of said jump instruction to running at said update native code.

5. The method of claim 3, wherein, if said modified functions are generic functions, further finding all functions instantiated using said generic functions;
performing just-in-time compilation respectively to each of the functions instantiated using said generic functions to obtain corresponding update native code; and
modifying a first instruction of the corresponding existing native code of each of the functions instantiated using said generic functions into a jump instruction to jump to and run at said corresponding update native code.

6. The method of claim 1, wherein, said update assembly comprises: a specific function for recording mapping relationships between added fields and existing objects in a global hash table;
when corresponding native code of said specific function is running, said native code performs the step of recording said mapping relationships between said added fields and said existing objects in said global hash table; and
when said existing objects are referenced, accessing the corresponding added fields of said existing objects according to said mapping relationships recorded by said global hash table.

7. The method of claim 6, wherein, the reference to said existing objects generated by recording the mapping relationships in said global hash table is a weak reference;
and the method further comprising: traversing the mapping relationships recorded in said global hash table as needed, and inspecting whether corresponding objects in the traversed mapping relationships are referenced, if not, deleting the mapping relationships of the unreferenced objects from said global hash table.

8. A hot-update apparatus, comprising:
a receiving unit, configured to obtain, in response to receiving a hot-update instruction by a running program, an update assembly and difference descriptions for describing differences between the update assembly and an existing assembly of the running program, wherein, identical metadata in said update assembly and said existing assembly have identical identifiers;
a modification determining unit, configured to load said update assembly into memory, and find, in said update assembly, functions which have been modified with respect to the existing assembly according to said difference descriptions;
a just-in-time compiling unit, configured to perform just-in-time compilation to the modified functions thus found to obtain update native code;
a running unit, configured to run said update native code in place of corresponding existing native code of said modified functions when said existing native code is required to be run;
an object finding unit, configured to, if it is determined that it is necessary to modify an access level of a specified method or an access level of a specified field according to said difference descriptions, find a corresponding object of said specified method or a corresponding object of said specified field; and
an attribute modifying unit, configured to make a corresponding modification to an access attribute of the object found by said object finding unit.

9. The apparatus of claim 8, further comprising:
a new assembly generating unit, configured to compile source codes modified according to requirements of said hot-update to generate the update assembly;
a structural adjusting unit, configured to perform structural adjustments to said update assembly, causing identical metadata in the adjusted update assembly and the existing assembly of the running program to have identical identifiers;
a comparing unit, configured to compare said update assembly with said existing assembly to generate a difference description file, wherein, said difference description file contains the difference descriptions for describing the differences between the update assembly and the existing assembly;
an instruction sending unit, configured to send the hot-update instruction to said running program, causing the running program to obtain said difference descriptions from said difference description file.

10. The apparatus of claim 9, further comprising:
an optimization processing unit, configured to, prior to performing structural adjustments to said update assembly, modify the names of the classes generated by compiler optimization in said update assembly, and copy the definitions of the classes generated by compiler optimization in said existing assembly into said update assembly, if the definitions of classes generated by compiler optimization in said update assembly and said existing assembly are different.

11. The apparatus of claim 8, further comprising: an instruction modifying unit, configured to modify a first instruction of the corresponding existing native code of said modified functions into a jump instruction to jump to and run at said update native code;

wherein, said running unit is configured to enter into and run said first instruction of said corresponding existing native code of said modified functions when said existing native code is required to be run, thereby jumping from the running of said jump instruction to running at said update native code.

12. The apparatus of claim 11, further comprising: a generic function finding unit, configured to, if said modified functions are generic functions, find all functions instantiated using said generic functions;

wherein said just-in-time compiling unit is configured to perform just-in-time compilation respectively to each of the functions instantiated using said generic functions as found by said generic function finding unit, to obtain the corresponding update native code;

said running unit is configured to modify a first instruction of the corresponding existing native code of each of the functions instantiated using said generic functions as found by said generic function finding unit into a jump instruction to jump to and run at said corresponding update native code.

13. The apparatus of claim 8, wherein, said update assembly comprises: a specific function for recording mapping relationships between added fields and existing objects in a global hash table;

when corresponding native code of said specific function is running, said native code performs the step of recording said mapping relationships between the added fields and the existing objects in said global hash table;

the apparatus further comprising an accessing unit, configured to, when said existing objects are referenced, access the corresponding added fields of said existing objects according to said mapping relationships recorded by said global hash table.

14. The apparatus of claim 13, wherein, the reference to said existing objects generated by recording the mapping relationships in said global hash table is a weak reference;

and the apparatus further comprising: an inspecting unit, configured to traverse the mapping relationships recorded in said global hash table as needed, and inspect whether the corresponding objects in the traversed mapping relationships are referenced, if not, delete the mapping relationships of the unreferenced objects from said global hash table.

15. A system, comprising one or more processing devices, and one or more non-transitory machine-readable media configured to store instructions that are executable by the one or more processing devices to:

obtain, in response to receiving a hot-update instruction by a running program, an update assembly and difference descriptions for describing differences between the update assembly and an existing assembly of the running program, wherein, identical metadata in said update assembly and said existing assembly have identical identifiers;

load said update assembly into memory, and find, in said update assembly, functions which have been modified with respect to the existing assembly according to said difference descriptions;

perform just-in-time compilation to the modified functions which have been found to obtain update native code;

run said update native code in place of corresponding existing native code of said modified functions when said existing native code is required to be run;

determine if it is necessary to modify an access level of a specified method or an access level of a specified field according to said difference descriptions, and if it is determined necessary, find a corresponding object of said specified method or corresponding object of said specified field; and make a corresponding modification to an access attribute of the object which has been found.

* * * * *